United States Patent [19]
Kasberger

[11] 3,735,572
[45] May 29, 1973

[54] TRACTOR-CARRIED MOWER AND HINGE ARRANGEMENT THEREFORE

[75] Inventor: Ludwig Kasberger, Gottmadingen, Germany

[73] Assignee: Maschinenfabrik Fahr AG, Gottmadingen, Germany

[22] Filed: Jan. 20, 1972

[21] Appl. No.: 219,276

[30] Foreign Application Priority Data
Jan. 22, 1971 Germany..................P 21 02 911.8

[52] U.S. Cl. ................56/16.2, 56/15.8, 56/228
[51] Int. Cl. ..............................................A01d 35/26
[58] Field of Search................56/6, 7, 14.9, 15.8, 56/15.9, 16.2, 16.3, 228, 503

[56] References Cited

UNITED STATES PATENTS

| | | | |
|---|---|---|---|
| 3,583,133 | 6/1971 | Kasberger | 56/6 |
| 3,593,504 | 7/1971 | Konig | 56/6 |
| 3,304,698 | 2/1967 | Herbsthofer | 56/228 X |

FOREIGN PATENTS OR APPLICATIONS

| | | | |
|---|---|---|---|
| 54,828 | 3/1967 | Germany | 56/6 |
| 703,134 | 1/1954 | Great Britain | 56/228 |

Primary Examiner—Hugh R. Chamblee
Assistant Examiner—J. A. Oliff
Attorney—Karl F. Ross

[57] ABSTRACT

A mower, preferably having a plurality of mower drums rotatable about respective vertical axes and spaced transversely apart upon a support beam, is connected to the elevatable three-point hitch structure of a tractor by a linkage allowing vertical displacement of the mower in one angular position of the beam with respect to the hinge assembly so that the mower drums may follow the contours of the ground. The junction between the frame and the hinge assembly is provided with abutment or stop selectively positionable to retain the attachment device, in an elevated position without supporting the frame on the ground to facilitate reattachment of the mower to the tractor.

10 Claims, 6 Drawing Figures

TRACTOR-CARRIED MOWER AND HINGE ARRANGEMENT THEREFORE

FIELD OF THE INVENTION

My present invention relates to outrigger-type mowers adapted to be attached to agricultural tractors and, more particularly, to improved attachment means between the three-point elevatable and lowerable tractor hitch structure and the linkage or frame of the mower.

BACKGROUND OF THE INVENTION

In outrigger-type mower arrangements, especially mower systems in which two or more drum-type mower-blade assemblies are provided for rotation about respective axes perpendicular to the terrain and are carried by a support beam and driven from the power takeoff of an agricultural tractor or by some other prime mover, some freedom of vertical movement is desired to accommodate changes in the ground level and varying contours of the ground.

For example, in my commonly assigned U.S. Pat. No. 3,583,133, issued June 8, 1971, there is described a mower arrangement in which the mower drums or assemblies are mounted upon a common support beam which can be raised and lowered to bring the mower blades out of engagement with the ground for transport of the assembly or to bring the mower assemblies into the crop-harvesting position respectively. In this system, the mower structure, including the individual mower assemblies and the support beam can, upon lowering of the hydraulic contours of the tractor, ride along the ground and move within limits to accommodate varying ground contours. The linkage includes a plurality of pivotable links articulated to the elevating means of the tractor and to the support beam which allow some vertical movement in the lowered position of the elevating structure of the tractor.

An agricultural tractor adapted to support such a mower may comprise a central upper hydraulically actuatable member and a pair of laterally outward lower member which together form the usual three-point hitch by which agricultural implements designed to be raised and lowered, are articulated to the tractor, a hydraulic motor, e.g. a hydraulic jack, may be connected to the central upper member and can also be attached to the lower members, as required.

One of the problems encountered in outrigger-type mower arrangements is that, upon release of the linkage from the tractor, when the mower is to be dismounted, the linkage falls under its own weight to the ground or at least drops below the attached point on the tractor. Since the mower must be rejoined to the tractor by backing the latter into engagement with the linkage, considerable disadvantage resides in the low portion of the latter. To avoid this disadvantage, it has been proposed, to provide a support foot for the linkage which retains it in its upper position in alignment with the attachment point on the tractor. While this reduces the number of people required to secure the mower in place, it nevertheless has the disadvantage that the linkage is incapable of any horizontal movement which may be required to adjust the position of its attachment site vis-a-vis the attachment site on the tractor. Consequently, the removal and remounting of the mower on the tractor constitutes a difficulty which is not fully overcome by a support foot for the mounting linkage.

OBJECTS OF THE INVENTION

It is, therefore, the principal object of the present invention to provide an improved mower of the outrigger type for use on an agricultural tractor and an improved tractor/mower combination whereby the aforementioned disadvantages may be obviated.

Yet another object of the invention is to provide an improved attachment linkage for an outrigger mower which enables the mower to be removed from and remounted upon an agricultural tractor with a minimum of effort and personnel.

Still another object of the invention is the provision of a system of the general character described in which a support foot for the outrigger linkage can be omitted and the rapid attachment of the linkage to a tractor nevertheless achived.

It is also an object of the invention to provide an improved outrigger-type mower which can be lifted from the ground into a transport position readily and conveniently but which also is able to move vertically relative to the tractor to accommodate changes in the terrain when the mower assembly is in an operative position, while enabling the mower assembly to be mounted upon and dismounted from an agricultural tractor with convenience and simplicity.

SUMMARY OF THE INVENTION

These objects and others which will become apparent hereinafter, are attained in accordance with the present invention with a mower assembly of the general type described in my above-mentioned U.S. Pat. No. 3,583,133 wherein, however, the support linkage is provided with locking means which selectively is operated, or rendered inoperative, to limit the vertical movement of the attachment end of the linkage so that, for example, the attachment will not fall under its own weight when the mower is removed from the tractor. The locking means can be released or rendered inoperative to permit freedom of vertical movement (at least within limits) of the mower assembly with respect to the tractor attachment site to accommodate changes in the terrain.

According to a more specific feature of this invention, the attachment means between the outrigger linkage and the tractor includes a control member or force-transmitting member adapted to bear upon an abutment fixed to one of the other elements of the mower assembly, e.g. the attachment-frame element provided on the three-point linkage of the tractor, one of the link elements of the outrigger linkage or the support-beam element of the mower or some member connected thereto.

Preferably and in accordance with an important feature of the invention, the three-point hitch of the tractor is provided with a three-point frame raisable and lowerable by the hydraulic mechanism of the tractor and is provided with hinge means defining the vertical axis about which an attachment link is swivelable, this attachment link pivotally accommodating the aforementioned control member for articulation thereof about a substantially horizontal axis. The frame can then be provided with an abutment angularly offset through 90° from the plane of the mower in its operating or outrigger position and engageable by the control member when the mower assembly is swung through 90°. The abutment thus may lie in the vertical longitudinal plane of the tractor extending in the direction of movement thereof and hence directly rearwardly of the tractor so that it is engaged by the control member when the outrigger linkage and mower assemblies are brought into this longitudinal plane. The outrigger linkage is thus held in an elevated position by the abutment for transport of the mower. The abutment can be selectively disengaged by swinging the outrigger linkage and mower assemblies through 90° into a position in which the mower lies in a vertical plane perpendicular to the direction of movement of the tractor and perpendicular to the aforementioned longitudianl plane.

I also provide a second abutment for the aforementioned control or force-transmitting member of the outrigger linkage which comes into play to prevent excessive upward movement of the mower and the linkage and which is, therefore, effective upon elevation of the attachment frame of the tractor to raise the mower from the ground into the transport position. When the outrigger linkage is swung into the transport position, the lower part of the control member (i.e. a portion thereof below the horizontal pivot axis) bears against the stationary abutment of the connecting frame. The upward-limiting abutment and this downward-limiting abutment thus coact to prevent or sharply restrict vertical movement when the mower is in its transport position. In the normal mowing position, however, the downward-limiting abutment is ineffective as already noted, so that sufficient play is available to accommodate changes in the ground contour.

According to another feature of the invention, the attachment means between the outrigger linkage and the frame may be provided with a manually controlled pin which couples the control or force-transmitting member to the frame against movement about the horizontal axis and thus forms the abutments mentioned earlier.

It will be apparent that the structure described above has the advantage that vertical mobility is permitted in the operating position of the mower but is limited in the transport position, the advantage that the attachment site of the linkage does not drop below the attachment site of the tractor so that a reduced number of workers can be used to couple the mower to the tractor, and the advantage that the outrigger linkage may in part balance the outermost mower assembly or assemblies so that the mower structure can pivot on an inner mower assembly to permit horizontal movement of the attachment site of the outrigger linkage with a minimum of force. The reduced vertical mobility during transport excludes jouncing of the mower assembly.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
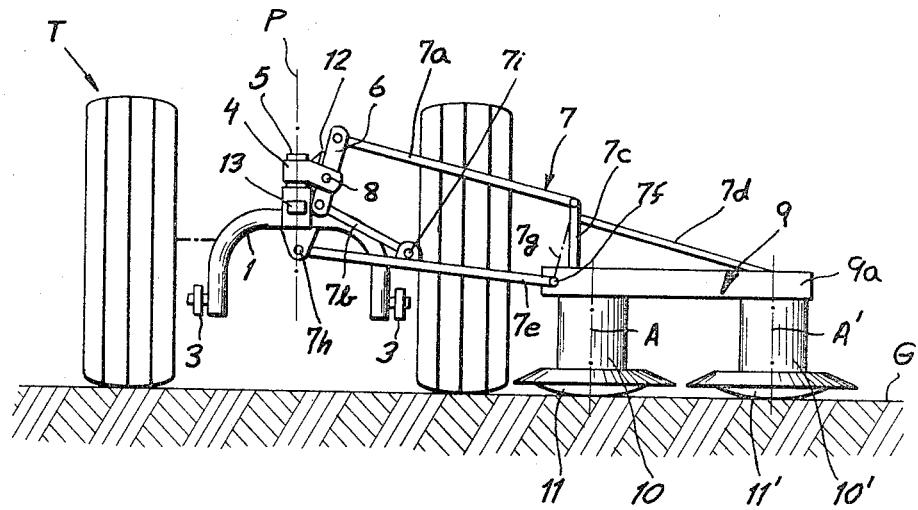
FIG. 1 is a diagrammatic end view of a tractor having a mower assembly linked thereto in accordance with the present invention.
Figure 2:
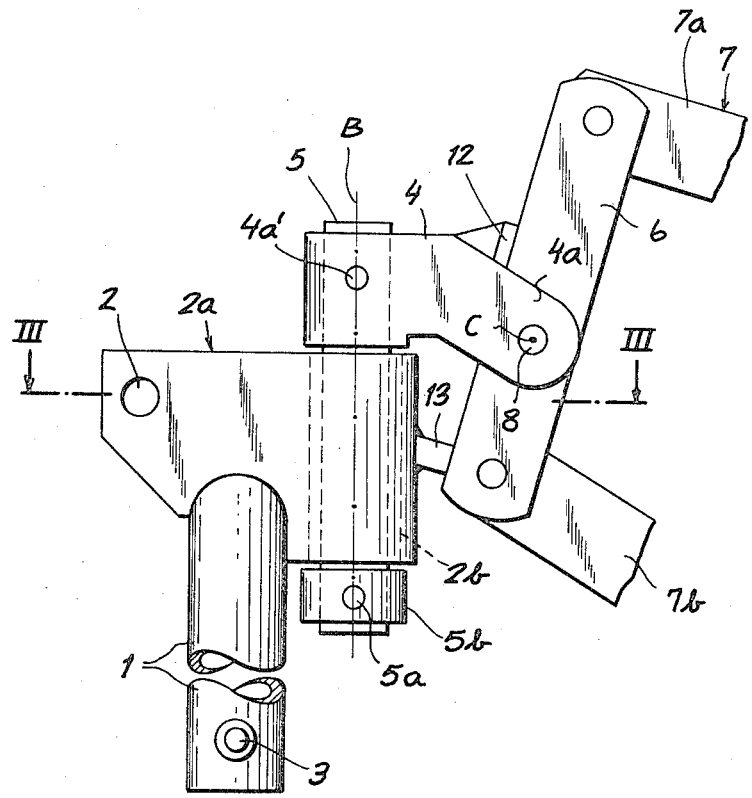
FIG. 2 is an enlarged side-elevational view of the attachment structure.
Figure 3:
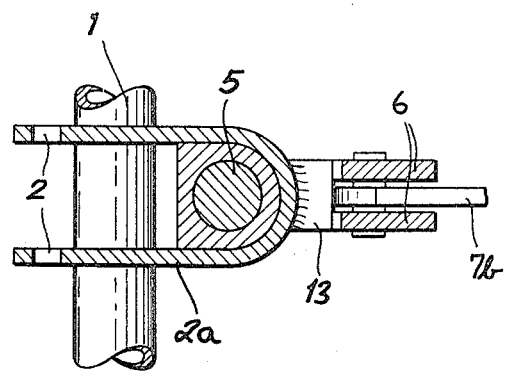
FIG. 3 is a cross-section taken along the line III — III of FIG. 2.
Figure 4:
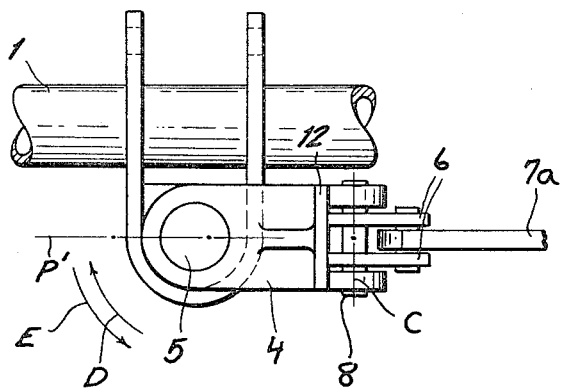
FIG. 4 is a plan view of a portion of the linkage shown in FIG. 2.

In FIGS. 1 – 4, I have shown a mower assembly which comprises an outrigger mower 9 connected by a linkage 6 to a tractor T, only the rear wheels of which have been shown. As is customary with such tractors, the prime mover comprises a three-point hitch, the two lower links of which are respresented at 3 whereas the upper link, not shown, is articulated at the bore 2 of an attachment plate represented generally at 2a. Points 2 and 3, therefore, represent the three-point coupling of the tractor. A rigid frame 1 of inverted-Y configuration, is connected to the three points of the hydraulically elevatable tractor hitch and can be raised and lowered by the usual hydraulic controls. In addition, the mower assembly 9 may be driven by the power takeoff of the tractor, via a power takeoff shaft and universal joints, not illustrated, by a prime mower mounted upon the mower assembly or some other power source. In these respects, see U.S. Pat. No. 3,583,133.

As described in this patent, the mowers of the assembly 9 are constituted by drums 10 and 10' carrying the usual cutting blades and rotatable about vertical axes A and A', transversely spaced along a beam 9a forming the support for the mowers. Support plates 11 and 11' are intended to rest upon the ground G as described in the aforementioned patent.

On the attachment frame 1, which is provided with the attachment link 2a as noted above along the shank of the inverted Y, is an eye 2b having a vertical axis B and receiving a pintle 5 which is rotatable about the vertical axis B. A pin 4a' connects a bifurcated attachment link 4 to the pintle 5 while another pin 5a secures a collar 5b to the pintle to prevent vertical movement of the pintle and the link 4 relative to the frame 1.

The arms 4a of the bifurcated link 4 embrace a control or force-transmitting member 6, here shown to consist of a pair of parallel bars (see FIGS. 3 and 4) between which are articulated the links 7a and 7b of the outrigger linkage 7 described earlier. The link 7a is articulated at its opposite end, to a bar 7c rising from the beam 9a close to its inner extremity and reinforced by a strut 7d. The link 7e is articulated at 7f to the inner end of the outrigger beam 9a and hence defines with bar 7a an effective linkage represented by the dot-dash line 7g and constituted by the mower assembly. The link 7e, moreover, is articulated to the frame and a lug 7h while the other link 7b is pivotally attached at 7i to the link 7e.

The member 6 is hinged, in turn, by a pin 8 to the attachment link 4 (which can swivel about the axis B) by a hinge pin 8 for rotation about a horizontal axis C. The bifurcated link element 4 is, moreover, provided with an abutment 12 between its arms and above the axis C to limit the rotation of member 6 in the counterclockwise sense. The frame 1 – 3 also is provided with a second abutment 13 extending rearwardly in the vertical longitudinal plane P of the tractor and engageable with member 6 when the latter is swung about axis B into its transport position. The abutments 12 and 13 are so positioned that member 6 and, consequently, linkage 7 is fixed against vertical movement when the system is brought into the transport position. In the transport position, illustrated in FIG. 2, the linkage 7, the beam 9a and the axes A and A' lie in the plane P, i.e. the mower assembly is swung through 90° in the direction of arrow D (FIG. 4) to align the member 6 with abutment 13.

When it is desired to bring the mower into its operating state, the linkage 7, the beam 9a and the link element 4 are swung about the vertical axis B through 90° (arrow E in FIG. 4) until the beam 9 lies in a plane P' perpendicular to the longitudinal plane P. The member 6 is thus released from abutment 13 and the mower can be lowered freely to the ground and is free to move vertically with excess upward movement being limited only by the abutment 12. The mower can thus ride upon the ground and follow its contours.

When the attachment frame 1 is lifted by the hydraulic three-point mechanism of the tractor, the control member 6 is swung counterclockwise about the axis C until it engages the abutment 12 whereby the linkage 7 is raised and the mowing assembly 9 lifted from the ground. The mowing assembly 9 and the linkage 7 are swung into the plane P (arrow D) and lowered until member 6 engages abutment 13.

When it is desired to move the mower, the latter is lowered to the ground until the support plates 11 and 11'. rest thereon. The frame is released from the three-point hitch of the tractor and contributes a downward force which at least in part balances the moment contributed by the mower drum 10' so that the entire mower can be swung in the clockwise and counterclockwise sense about axis A and on shoe or plate 11, thereby enabling the attachment arrangement to move in a horizontal direction and to be easily remounted upon the tractor. Since the abutment 13 remains in engagement with the member 6, the linkage 7 does not lower to the ground. Only one man is necessary, therefore, to mount the mower on tractor or release it therefrom.

Figure 5:
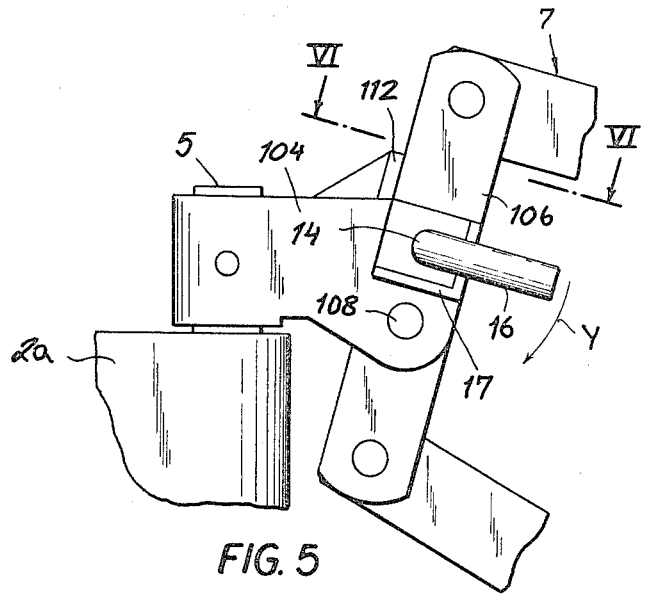
FIG. 5 is a side-elevational view illustrating another embodiment of the invention.
Figure 6:
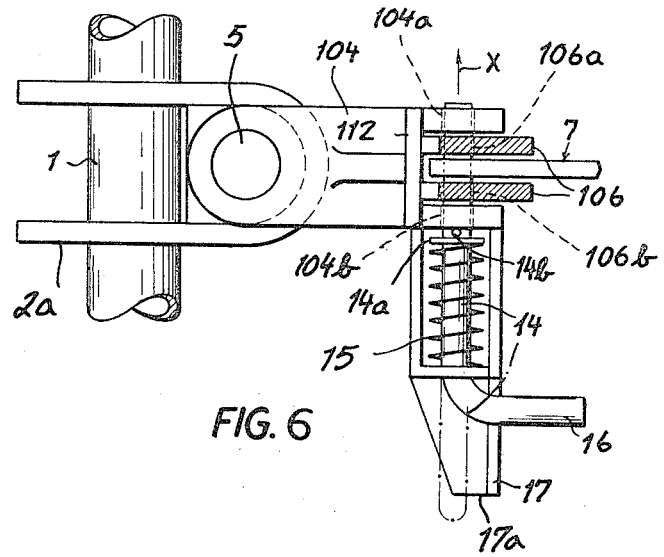
FIG. 6 is a cross-section taken along the line VI — VI of FIG. 5.

In FIGS. 5 and 6, I have shown another embodiment of the invention wherein the swivel link 104 is provided above the hinge pin 108 with an aubtment 112 whose purpose has been described in connection with the abutment 12 previously. However, the arms of the swivel 104 are also provided with bores 104a and 104b alignable with bores 106a and 106b in the members 106 articulated by the pin 108 to the swivel link 104.

A manually controlled pin 14 is biased by a spring 15 seated against a ring 14a and a pin 14b of the locking member 14, in the direction of arrow X. An elbow 16 of the locking pin 14, enables the pin to be withdrawn. The pin 14 is guided in a channel 17 which forms a stop 17a such that, when the pin 14 is withdrawn, the handle 16 can be rotated in the clockwise sense through 90° (arrow Y) until the handle comes to rest on the abutment 17a. In this position the pin is withdrawn from bores 104a, 104b and 106a, 106b to enable the linkage 7 to swing as previously described. When the pin 14 is in place, however, vertical movement of the linkage with respect to the swivel 104 is prevented.

I claim:

1. A mower arrangement adapted to be mounted on a tractor having an elevatable and lowerable attachment element, said mower arrangement comprising a support element provided with at least one mower adapted to be entrained along the ground by said tractor; a linkage element articulated to said support element and to said attachment element for enabling elevation and lowering of said mower relative to the tractor; a force-transmitting member articulated to said linkage element and pivotal upon vertical movement of said mower relative to said tractor; and abutment means including first and second abutments on at least one of said elements, said abutments being angularly offset about a vertical axis, said first abutment being selectively engageable by said member in a transport position of said mower for preventing upward vertical displacement thereof relative to said tractor, said second abutment being disposed to allow vertical displacement of said mower in a working position thereof while retaining said linkage element in an elevated position to enable coupling of said linkage element to said attachment element, said mower being angularly shiftable about said vertical axis between said working position and said transport position.

2. The mower arrangement defined in claim 1 wherein said attachment element is an attachment frame and said tractor has a three-point hitch mechanism connectable with said frame, said frame being provided with a vertically extending swivel pin and a swivel link angularly displaceable about said vertical axis as defined by said pin, said member being articulated to said swivel link for movement about a horizontal axis, said first abutment formed on said swivel link and being engageable by said member above said horizontal axis to limit upward movement of said linkage element and said support element beyond a position defined by said first abutment.

3. The mower arrangement defined in claim 2 wherein said second abutment is formed on said frame and is engageable by said member upon rotation of said swivel link, said member, said linkage element and said support element through 90° about said vertical axis into a position in the direction of movement of the tractor, said second abutment retaining said support element in an elevated position for transport.

4. The mower arrangement defined in claim 3 wherein said first and second abutments are so arranged and constructed as to substantially prevent vertical displacement of said support element in the last-mentioned position.

5. The mower arrangement defined in claim 2 wherein said abutment means includes a pin manually displaceable to lock said member to said swivel link against angular displacement of said member relative to said swivel link.

6. The mower arrangement defined in claim 5, further comprising means for retaining said manually displaceable pin out of locking interengagement with said member and said swivel link.

7. The mower arrangement defined in claim 6, further comprising spring means bearing upon said manually displaceable pin for urging the same into interlocking engagement of said member with said swivel link.

8. The mower arrangement defined in claim 1 wherein said abutment means is provided at least in part on said support element.

9. The mower arrangement defined in claim 1 wherein said abutment means is provided at least in part on said linkage element.

10. The mower arrangement defined in claim 2 wherein said linkage element comprises a first link articulated at one end to said member at one side of said horizontal axis and to said support element, a second link articulated to said member at the opposite side of said horizontal axis and pivotally connected to said support element, and a third link articulated to said frame and to the second link, said support element including a longitudinally extending outrigger beam provided with a plurality of horizontally spaced mowers each rotatable about a respective vertical axis.

* * * * *